United States Patent
Trolle et al.

(10) Patent No.: US 10,944,348 B2
(45) Date of Patent: Mar. 9, 2021

(54) METHOD AND APPARATUS FOR CHARACTERISATION OF A THREE PHASE INDUCTION MOTOR

(71) Applicant: Danfoss Power Electronics A/S, Grasten (DK)

(72) Inventors: Nicolas Trolle, Borkop (DK); Sanjeet Kumar Dwivedi, Sonderborg (DK)

(73) Assignee: Danfoss Power Electronics A/S, Grasten (DK)

( * ) Notice: Subject to any disclaimer, the term of this patent is extended or adjusted under 35 U.S.C. 154(b) by 92 days.

(21) Appl. No.: 16/079,635

(22) PCT Filed: Mar. 7, 2016

(86) PCT No.: PCT/EP2016/054790
§ 371 (c)(1),
(2) Date: Aug. 24, 2018

(87) PCT Pub. No.: WO2017/152938
PCT Pub. Date: Sep. 14, 2017

(65) Prior Publication Data
US 2019/0222156 A1    Jul. 18, 2019

(51) Int. Cl.
*G01R 15/00*    (2006.01)
*H02P 23/14*    (2006.01)
(Continued)

(52) U.S. Cl.
CPC .............. *H02P 23/14* (2013.01); *H02P 21/16* (2016.02); *H02P 27/06* (2013.01); *H02P 21/14* (2013.01)

(58) Field of Classification Search
CPC .......... H02P 23/14; H02P 21/16; H02P 27/06; H02P 21/14
(Continued)

(56) References Cited

U.S. PATENT DOCUMENTS

| 4,670,698 A | 6/1987 | Fulton et al. |
| 6,489,742 B2 * | 12/2002 | Lumsden ................ H02P 27/02 |
| | | 318/727 |

(Continued)

FOREIGN PATENT DOCUMENTS

WO    2015/015342 A1    2/2015

OTHER PUBLICATIONS

International Search Report for PCT Serial No. PCT/EP2016/054790 dated Feb. 12, 2016.

*Primary Examiner* — Eduardo Colon Santana
*Assistant Examiner* — Zemenay T Truneh
(74) *Attorney, Agent, or Firm* — McCormick, Paulding & Huber PLLC (57) ABSTRACT

A method (400) of determining equivalent circuit parameters of a three phase induction motor is provided. The method (400) comprises applying (410) a current to a stator winding (362) of an induction motor (360), and varying (420) a voltage applied to the stator winding to regulate the applied current to be a constant current. Application of the current is terminated (430) when the applied voltage has reached a constant voltage. The equivalent circuit parameters are determined (440) from the value of the constant current, the values of the applied voltage, and a time period until the applied voltage attains the constant voltage. The method may provide values for a resistance (210) of the stator winding, a resistance (250) of a rotor winding (364), a magnetizing inductance (230), and a total inductance leakage value (220, 240) for the stator winding and the rotor winding.

20 Claims, 9 Drawing Sheets

(51) Int. Cl.
  *H02P 21/16*  (2016.01)
  *H02P 27/06*  (2006.01)
  *H02P 21/14*  (2016.01)
(58) Field of Classification Search
  USPC .......................................... 318/812; 702/57
  See application file for complete search history.

(56) References Cited

U.S. PATENT DOCUMENTS

| | | |
|---|---|---|
| 2006/0273755 A1 | 12/2006 | Heikkilae |
| 2011/0001447 A1 | 1/2011 | Heikkilae |
| 2011/0010116 A1* | 1/2011 | Heikkila ................ H02P 23/14 |
| | | 702/57 |
| 2013/0096865 A1* | 4/2013 | Gao ...................... G01R 31/34 |
| | | 702/108 |
| 2014/0167674 A1* | 6/2014 | Wang ..................... H02P 23/14 |
| | | 318/798 |
| 2014/0184135 A1* | 7/2014 | Bazzi .................... H02P 23/14 |
| | | 318/798 |

* cited by examiner

PRIOR ART

Fig. 1

PRIOR ART

METHOD AND APPARATUS FOR CHARACTERISATION OF A THREE PHASE INDUCTION MOTOR

CROSS-REFERENCE TO RELATED APPLICATION

This application is a National Stage application of International Patent Application No. PCT/EP2016/054790, filed on Mar. 7, 2016, which is hereby incorporated by reference in its entirety.

TECHNICAL FIELD

The present invention relates to a method and apparatus for determining the equivalent circuit parameters of a three phase induction motor.

BACKGROUND

Figure 1:
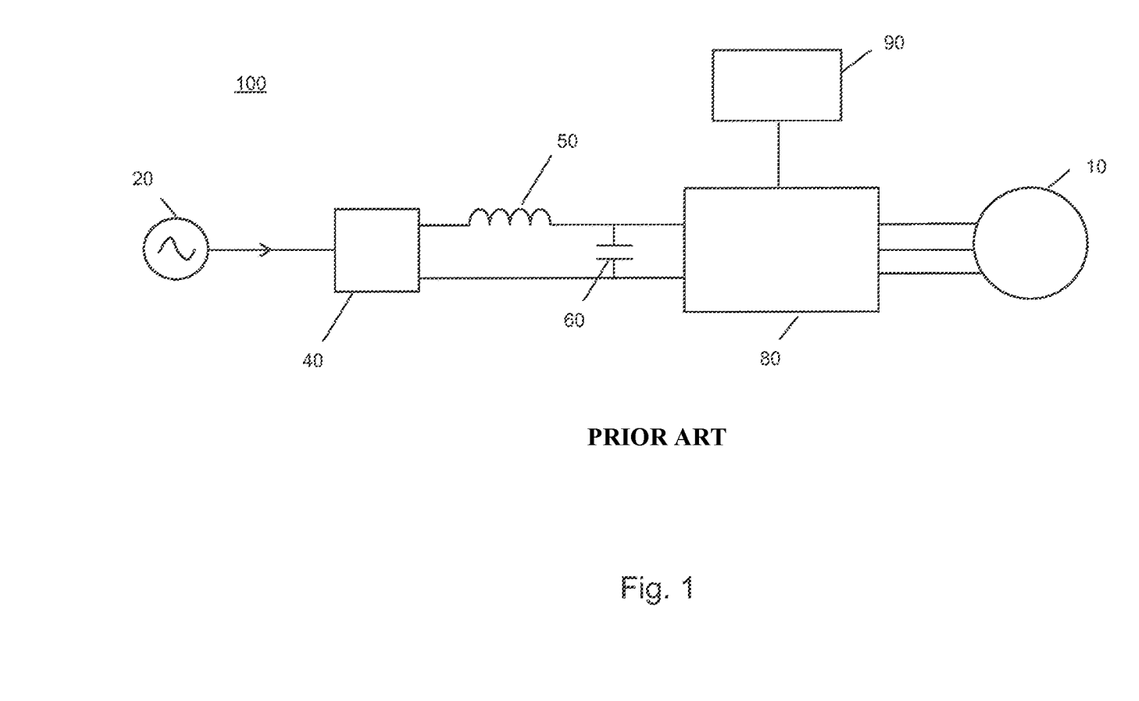
FIG. 1 is a schematic block diagram of a known motor system.

FIG. 1 is a schematic block diagram of a known motor system, which is indicated generally by reference numeral 100. The motor system 100 comprises a three-phase induction motor 10. The induction motor system 100 also comprises an alternating current (AC) power source 20, a rectifier 40, an inductor 50, a direct current (DC) link capacitor 60, an inverter module 80 and a controller 90.

As is well known in the art, the rectifier 40 and inductor 50 convert AC electrical power provided by the AC power source 20 into a DC source at the DC link capacitor 60. The inverter module 80 comprises a number of switching elements, which are typically insulated gate bipolar transistors (IGBTs). The switching elements are used to convert the DC signal at the DC link capacitor 60 into three AC signals. The three AC signals are provided to each of the phases of the three-phase induction motor 10. The controller 90 provides switching instructions for each of the switching elements of the inverter module 80. Thus, the controller 90 is able to control precisely the frequency and phase of each of the signals provided to the three-phase induction motor 10.

The controller 90 may, for example, be used to control the three-phase induction motor 10 in order to provide a desired speed and/or torque. In order to enable accurate control, it is necessary for the controller 90 to take into account the electromagnetic properties of the three-phase induction motor 10.

One method of taking into account the electromagnetic properties of the three-phase induction motor 10 is to use data sheet information relating to the three-phase induction motor 10. However, even when this information is available, it is often insufficiently precise and accurate to enable accurate and efficient control of the three-phase induction motor 10.

An alternative to using data sheet information is to measure the characteristics of the three-phase induction motor 10 itself. For example, the controller 90 may control the injection of signals into the three-phase induction motor 10, and monitor the response to those signals. On the basis of those responses, the controller 90 may estimate various resistances and inductances of the three-phase induction motor 10.

Figure 2:
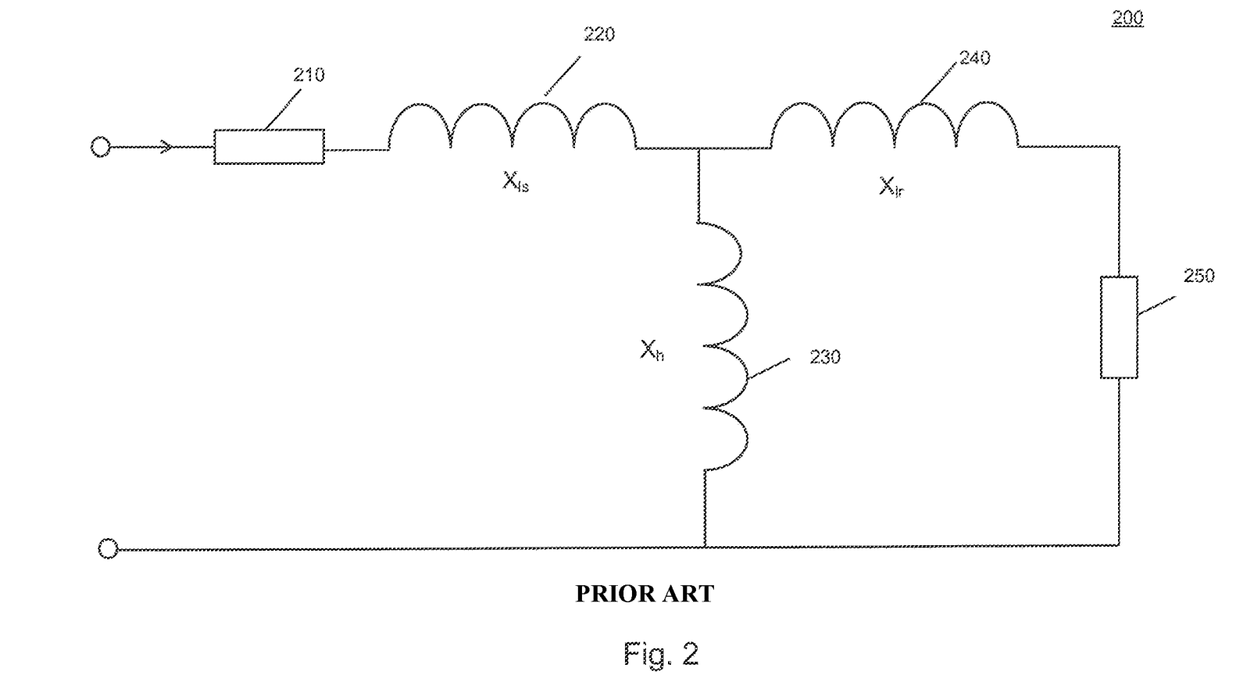
FIG. 2 is an electrical equivalent circuit of an asynchronous motor.

FIG. 2 is an electrical equivalent circuit of a three-phase induction motor, such as the three-phase induction motor 10 described above, when the three-phase induction motor 10 is at standstill. The three-phase induction motor 10 comprises a stator winding and a rotor winding. The term 'rotor winding' is used henceforth to cover both a rotor cage, or a rotor winding.

The equivalent circuit, indicated generally by the reference numeral 200, includes a stator resistance 210 of resistance value $R_s$. A stator leakage inductance $X_{ls}$ 220 has value $L_{ls}$. Magnetising inductance $X_h$ 230 comprises the mutual inductance of the three-phase induction motor 10, and has a value $L_h$. A rotor leakage inductance $X_{lr}$ 240 has value $L_{lr}$. A rotor resistance 250 is of resistance value $R_r$.

The three-phase induction motor also has a rotor inductance value $L_r$, which is the total of the inductance value $L_h$ of the magnetising inductance $X_h$ 230 and the inductance value $L_{lr}$ of the rotor leakage inductance $X_{lr}$ 240. Thus:

$$L_r = L_h + L_{lr}.$$

The three-phase induction motor 10 also has a stator inductance value $L_s$. The stator inductance value $L_s$ is the total of the inductance value $L_h$ of the magnetising inductance $X_h$ 230 and the inductance value $L_{ls}$ of stator leakage inductance $X_{ls}$ 220. Thus:

$$L_s = L_h + L_{ls}.$$

SUMMARY

The present invention provides a method in accordance with appended claim 1. The method allows determination of the equivalent circuit parameters of a three-phase induction motor, the three-phase induction motor comprising a stator winding and a rotor winding. The method comprises applying a current to the stator winding and varying a voltage applied to the stator winding so as to regulate the current applied to the stator winding to be a constant current. Application of the current terminates when the applied voltage has reached a constant voltage. The equivalent circuit parameters are then determined from the constant current, the applied voltages and a time period until the applied voltage attains the constant voltage.

The present invention also provides a control system in accordance with appended claim 17. The induction motor control system comprises a current regulator for a three-phase induction motor comprising a stator winding and a rotor winding. A control module for determining equivalent circuit parameters of the three-phase induction motor is configured to apply a current to the stator winding, and to vary a voltage applied to the stator winding so as to regulate the current applied to the stator winding to be a constant current. The control module is configured to terminate application of the current when the applied voltage has reached a constant voltage. The control module is also configured to determine the equivalent circuit parameters of the three-phase induction motor from the constant current, the applied voltages, and a time period until the applied voltage attains the constant voltage.

The present invention also provides induction motor system in accordance with appended claim 20. The induction motor system comprises the induction motor control system of the invention and a three phase induction motor comprising a stator winding and a rotor winding.

The dependent claims provide details of embodiments of the invention.

The method and systems of the present invention may permit the rapid characterization of a three-phase induction motor. This approach may be particularly useful when an existing motor is replaced by another motor, for example a new motor, and accurate values of circuit parameters of the replacement motor are not available from a data sheet or other source. In this case, the method and system may allow the characterization of motor parameters in a time period that is sufficiently short to cause minimal 'down-time' for the motor system, prior to first switching on the motor for normal use.

Alternatively or in addition, the method may be used to measure circuit parameters of a motor periodically in normal use, i.e. at other times that just the occasion when a motor is replaced. Such measurements may allow varying values for the circuit parameters to be kept accurate. Variation in values for the circuit parameters may occur, for example, as a motor ages and its circuit parameters alter over time.

BRIEF DESCRIPTION OF THE DRAWINGS

The invention will now be described in further detail with reference to the following schematic drawings, in which.

DETAILED DESCRIPTION

Figure 3:
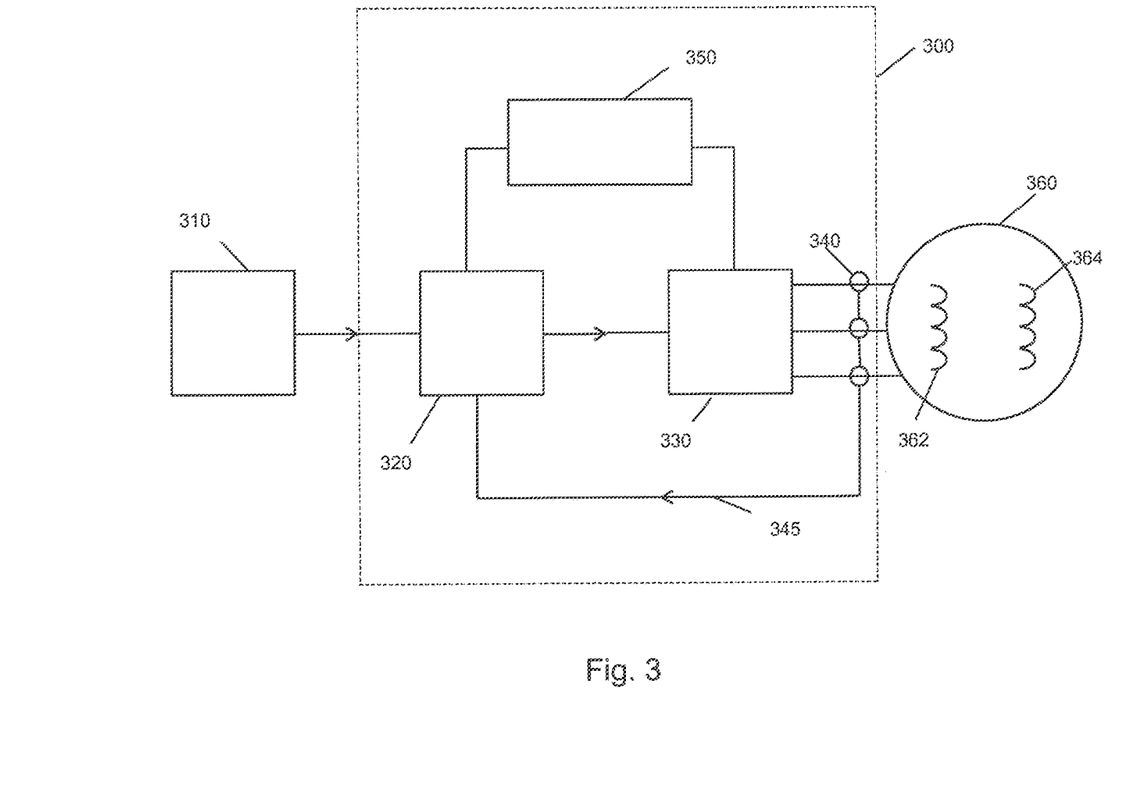
FIG. 3 is a schematic block diagram of an induction motor control system in accordance with the present invention.

FIG. 3 is a schematic block diagram of an induction motor control system 300 in accordance with the present invention. In the illustrated embodiment, induction motor control system 300 comprises a current regulator 320, an inverter module 330, a sensor 340, a feedback path 345 and a control module 350.

In FIG. 3, power supply 310 is connected to current regulator 320. Power supply 310 provides power to induction motor control system 300. Power supply 310 may, for example, correspond generally to alternating voltage source 20 and rectifier 40 of FIG. 1.

Current regulator 320 of motor control system 300 receives as its input the output of power supply 310, together with control signals from control module 350. Current regulator 320 provides a regulated output current to inverter module 330.

Inverter module 330, in turn, supplies current to induction motor 360. Induction motor 360 comprises a stator winding 362 and a rotor winding 364, which generally correspond to the electrical arrangement shown in FIG. 2. Induction motor 360 is a three phase motor.

As illustrated in FIG. 3, control module 350 provides input signals to current regulator 320 and inverter module 330. In operation of the induction motor 360, control module 350 may control precisely the frequency and phase of each of the signals provided to induction motor 360. Sensor 340 comprises a current sensor, for each phase. Path 345 illustrates the supply, to current regulator 320, of data concerning the outputs of current that are supplied to induction motor 360.

Control module 350 determines equivalent circuit parameters of induction motor 360. The equivalent circuit parameters of induction motor 360 are as generally described with reference to FIG. 2. Control module 350 is configured to:
  a) Apply a current I to the stator winding 362 of induction motor 360. This current I may be controlled by current regulator 320 to take on a value $I_c$ commanded by control module 350.
  b) Vary a voltage V applied to the stator winding 362 of induction motor 360, so as to regulate the current I applied to the stator winding 362 to be a constant current $I_c$.
  c) Terminate application of the current $I_c$ when the applied voltage V has reached a constant voltage value $V_c$.
  d) Determine the equivalent circuit parameters of induction motor 360 from the value of the constant current $I_c$, the values of the applied voltage V, and a time period until the applied voltage attains the constant voltage $V_c$.

Control module 350 of induction motor control system 300 may be configured to apply to the stator winding 362 of induction motor 360 a constant current $I_c$, the constant current $I_c$ being the nominal operating current of the induction motor 360 when in use. The constant current $I_c$ that is chosen may vary from the nominal operating current of induction motor 360. However, the accuracy of the method of the invention may increase for values of constant current $I_c$ that are closer to the nominal operating current of the induction motor 360. The induction motor 360 remains stationary during application of the constant current $I_c$.

At the start of the application of constant current $I_c$, the current does not flow through inductance $X_h$ 230 of the induction motor 360. Thus at the start of the application of constant current $I_c$, constant current $I_c$ flows through stator resistance 210, stator leakage inductance $X_{ls}$ 220, rotor leakage inductance $X_{lr}$ 240 and rotor resistance 250. Once the induction motor 360 has become magnetized, the rotor resistance 250 is effectively short-circuited by the magnetizing inductance $X_h$ 230. Thus, once the induction motor 360 has become magnetized, the ratio of the constant voltage $V_c$ and the constant current $I_c$ provides the stator resistance 210.

FIG. 3 shows motor control system 300 together with a separate power supply 310 and a separate induction motor 360. Motor control system 300 may be built and supplied separately from either or both power supply 310 and induction motor 360. However, in an alternative arrangement, motor control system 300 may be supplied as an induction motor system together with at least induction motor 360.

Motor control system 300 may be configured to determine the equivalent circuit parameters of the induction motor 360 during a measurement phase. Then, once the parameters have been determined, motor control system 300 can generate a drive voltage for normal operation of the induction motor 360, the generation being based on the determined equivalent circuit parameters of the induction motor 360.

Figure 4:
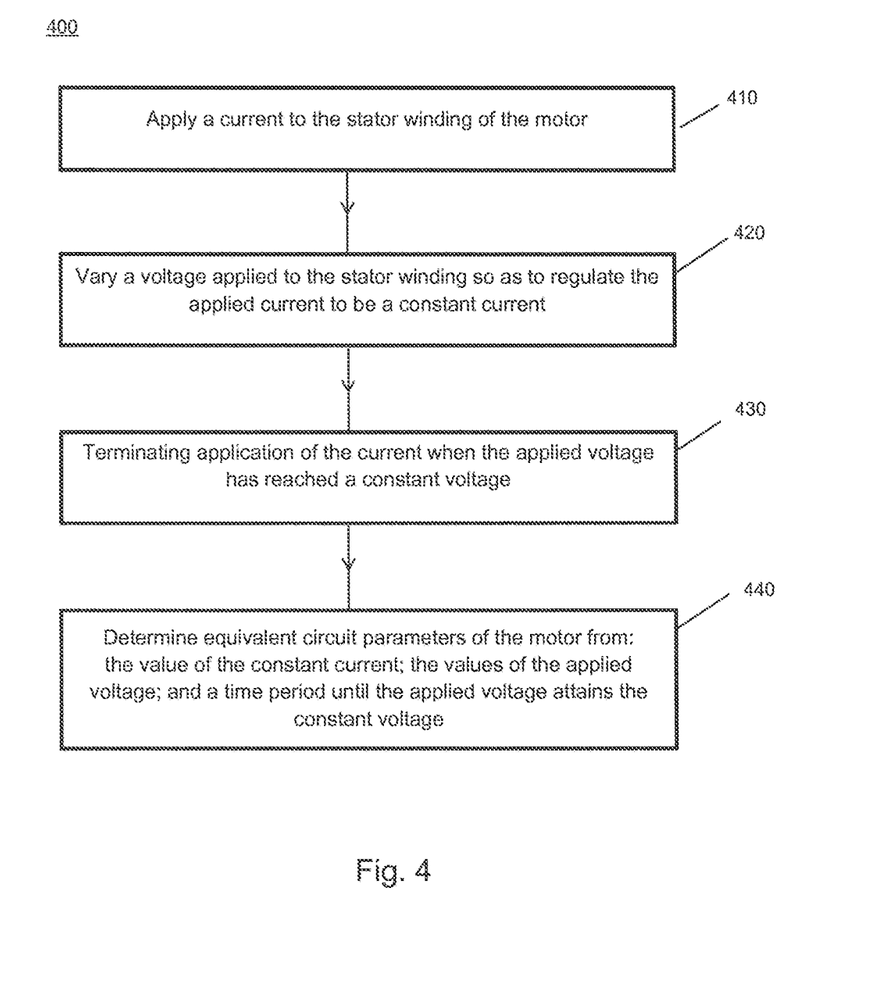
FIG. 4 is a flow chart of a method in accordance with the present invention.

FIG. 4 is a flow chart of a method 400 in accordance with the present invention. Method steps 410-440 correspond generally to points a) to d) described above in connection with FIG. 3.

At step 410, current regulator 320 applies a current $I_c$ to induction motor 360. The current I is regulated by current regulator 320, in step 420, so as to regulate its value to a constant current $I_c$. Control module 350 acts to set the value of the applied current I, by varying the output voltage V.

Current regulator 320 receives, via path 345, data concerning the outputs of current I that are supplied to induction motor 360. Control module 350 stores data concerning the values of voltage V that are applied.

At step 430, current regulator 320 terminates application of the current I. Current regulator 320 terminates application of the current $I_c$, when the voltage V applied to induction motor 360 has reached a constant voltage value $V_c$. Again, current regulator 320 acts under control of control module 350.

At step 440, the method of the invention determines equivalent circuit parameters of induction motor 360. This determination is based on the value of the constant current $I_c$, the values of the applied voltage, and a time period until the applied voltage attains the constant voltage $V_c$. Further details of these parameters are illustrated in connection with FIG. 6.

The method 400 of the present invention may permit the rapid characterization of an induction motor 360. An example of an application where the method may be particularly advantageous is the replacement of an existing induction motor by another motor 360, for example a new motor. When a new motor such as induction motor 360 is connected to induction motor control system 300 of the present invention, accurate values of circuit parameters of the new induction motor 360 may not be available from a data sheet or other source. In this case, the method 400 may allow the characterization of motor parameters in a time period that is sufficiently short to cause minimal 'downtime' for the induction motor 360. The characterization of the motor parameters may occur, for example, in less than 15 seconds, and may be completed considerably more quickly in the case of many motors.

Alternatively or in addition, method 400 may be used to measure circuit parameters of an induction motor 360 at other times, in normal use. These measurements may, for example, be at predetermined intervals, or each time the motor starts, or after a predetermined number of motor starts. Thus, method 400 may be used at other times than just the occasion when an induction motor 360 is replaced. Such measurements may allow varying values for the circuit parameters of induction motor 360 to be kept accurate. Variation in values for the circuit parameters may occur, for example, as induction motor 360 ages and its circuit parameters alter over time.

Figure 5:
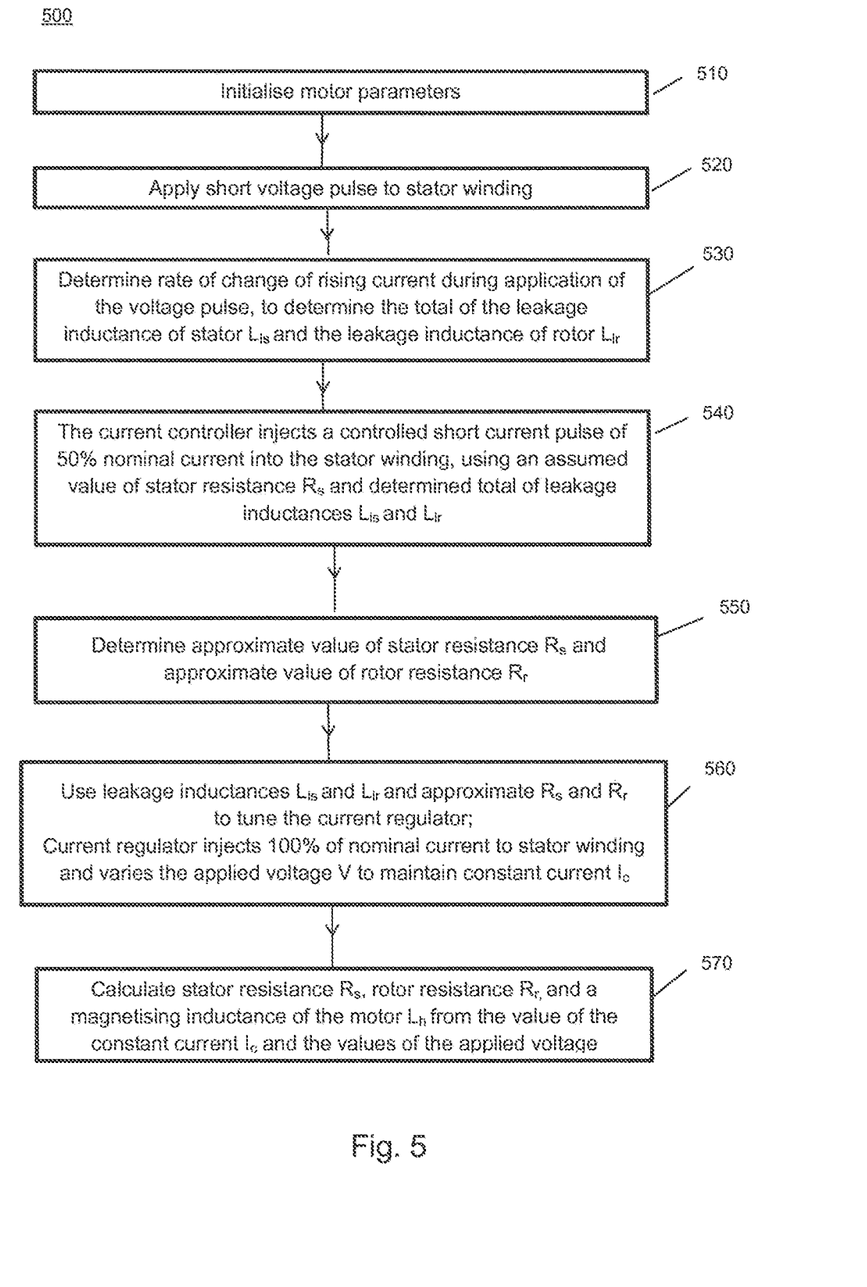
FIG. 5 is a flow chart of a further method in accordance with the present invention.
Figure 6:
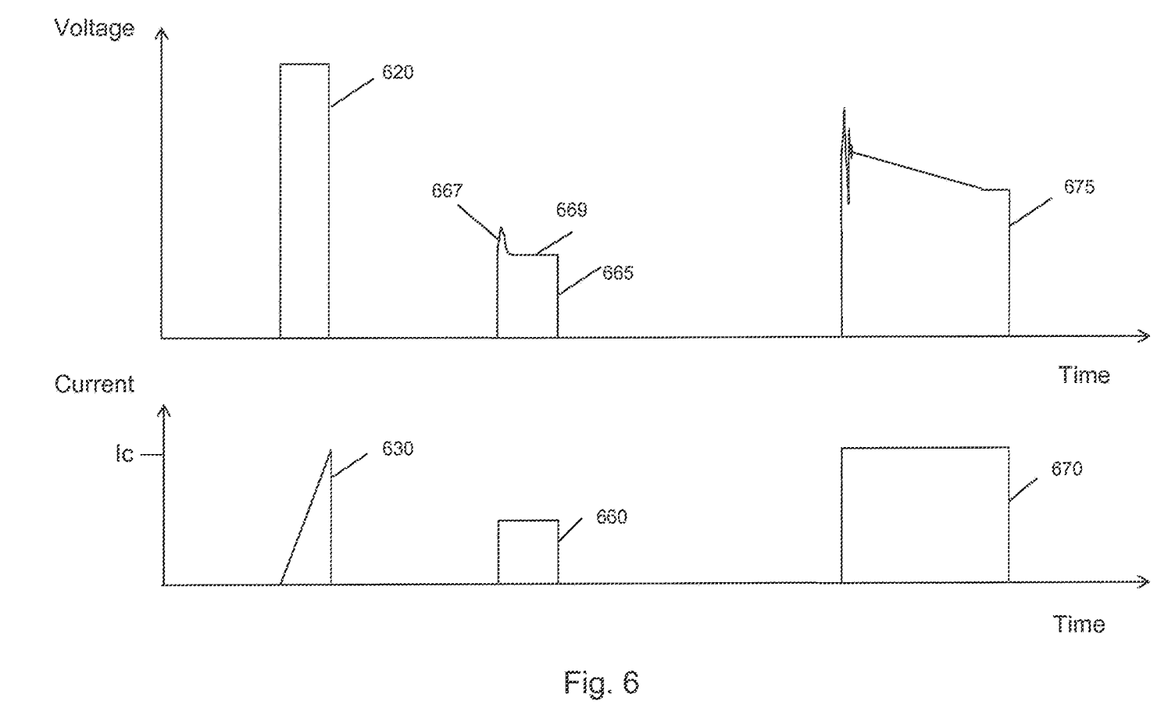
FIG. 6 is graphical representation of voltage and current signals that may be observed when implementing the method of the flow chart of FIG. 5.

FIG. 5 is a flow chart of a further method 500 in accordance with the present invention. FIG. 5 should be read together with FIG. 6. FIG. 6 is graphical representation of voltage V and current I signals that may be observed when implementing the method of the flow chart of FIG. 5. The upper trace of FIG. 6 represents the voltage applied to induction motor 360, plotted against time. The lower trace of FIG. 6 represents the current I applied to induction motor 360, plotted against time. The time axes of the upper and lower traces of FIG. 6 indicate the same time, i.e. the zero point of time is the same for the upper and lower traces. However, the time scales are not linear, and this has been done in order to allow short and long pulses to be shown on a single graph. Throughout FIGS. 6-8, corresponding points of the waveforms are shown with corresponding reference numerals.

Step 510 of the method of FIG. 5 indicates initialization, by control module 350, of parameters of induction motor 360. The parameters of interest of induction motor 360 may include those illustrated in connection with FIG. 2: the value $R_s$ of stator resistance 210; the inductance value $L_{ls}$ of stator leakage inductance $X_{ls}$ 220; the inductance $L_h$ of magnetising inductance $X_h$ 230; the inductance value $L_{lr}$ rotor leakage inductance $L_{lr}$; and the rotor resistance $R_r$.

Induction motor 360 also has:

A value $L_r$ for the rotor inductance, which is the total of the inductance value $L_h$ of the magnetising inductance $X_h$ 230 and the inductance value $L_{lr}$ of the rotor leakage inductance $X_{lr}$ 240. Thus $L_r=L_h+L_{lr}$.

A value $L_s$ for the stator inductance. The stator inductance value $L_s$ is the total of the inductance value $L_h$ of the magnetising inductance $X_h$ 230 and the inductance value $L_{ls}$ of stator leakage inductance $X_{ls}$ 220. Thus $L_s=L_h+L_{ls}$.

The above parameters may all be initialized, in step 510, to a value of zero. This may occur, for example, when induction motor 360 is first connected to motor control system 300.

Alternatively, however, some or all of these parameters may be initialized in step 510 to values other than zero. An example of where this might occur is where some values of the parameters of motor control system 300 are known from a data sheet or other source of information provided with induction motor 360. Another example is where motor control system 300 has previously driven induction motor 360. In this case, motor control system 300 has carried out a previous cycle of measurement of some or all of the above parameters, before or as part of that operation of induction motor 360.

At step 520, control module 350 commands the supply of a short voltage pulse to the stator winding 362 of induction motor 360. Voltage pulse 620 in FIG. 6 indicates the short voltage pulse applied in step 520. The current regulator does not need to be used for the voltage pulse. A full DC link voltage can be applied to induction motor 360. Then, using a rapid interval between measurements, the rising current is monitored. The interval between measurements may be, for example, 0.01 milliseconds. The supply of the DC link voltage can then be turned off, when a desired current is reached, the desired current being sufficient to provide an accurate measurement of the rate of change of current. The duration of voltage pulse 620 may be in the range 0.02 millisecond to 3 milliseconds, in a non-limiting illustrative example.

The magnitude of the voltage pulse 620, referred to generally above as the DC link voltage, may be set to the full DC voltage that would be applied in normal operation of induction motor 360.

In some applications, the normal operating voltage may just be the voltage that provides the 'nominal current' of induction motor 360. This occurs typically when a motor is in an application where it may have to operate continuously for very long periods, and cannot be allowed to overheat and cut out.

In other applications, an induction motor 360 may not be expected to be in continuous use. In these applications, a smaller induction motor 360 may be installed and then run at a current that is more than 100% of its nominal current. For example, an induction motor 360 that is not to be run continuously may be supplied intermittently with, for example, up to 160% of its nominal current. The 160% of nominal current may be acceptable for normal operation, when there will be such extended interruptions in normal operation that the interruptions will allow the induction motor 360 to cool. Many uses of motors entail such significant interruptions. Some motors only run for a small proportion of the time, and 'undersized' motors that are run at currents above their nominal currents will be routinely installed in such applications.

Current pulse 630 in FIG. 6 shows the current I that flows to induction motor 360 during application of voltage pulse 620. As illustrated, current pulse 630 has a rising initial portion.

At step 530, control module 350 determines the rate of change of the rising current pulse 630 during application of voltage pulse 620. Determination of the rate of change of the rising current pulse 630 leads to a determination of a total leakage inductance value, i.e. the total of the leakage inductance of stator $L_{ls}$ and the leakage inductance of rotor $L_{lr}$.

We can denote the magnitude of voltage pulse 620 as $V_{620}$, and the magnitude of current reached as $I_{630}$ in a time $T_{630}$ for which the voltage pulse is applied. The total leakage inductance may then be calculated using the formula:

$$Lls+Llr=(V_{620} \times T_{630})/I_{630}$$

At step 540, the control module 350 sets a value for a short current pulse to be applied to induction motor 360, using an assumed value of stator resistance $R_s$ together with the determined total value for the leakage inductances $L_{ls}$ and $L_{lr}$.

As shown also in step 540, the amplitude of the current pulse 660 that current regulator 320 applies to induction motor 360 may be 50% of the maximum current that would be applied to the stator winding 362 of induction motor 360 in normal operation. Such a current pulse is illustrated as current pulse 660 in the lower trace of FIG. 6. The resulting voltage pulse is shown as voltage pulse 665 in the upper trace of FIG. 6. Voltage pulse 665 has an initial peak 667, followed by a settling period and finally a generally flat voltage portion 669.

The duration of current pulse 660 may be a few hundred milliseconds. In a non-limiting illustrative example, the duration of current pulse 660 may be in the range 0.1 seconds to 0.5 seconds. In a further non-limiting illustrative example, the initial constant current of current pulse 660 may comprise a current of between 30% and 70% of the normal operating current of the induction motor.

The short voltage pulse 620 and current pulse 660 can only be shown clearly on FIG. 6 by varying the scale of the time axis across FIG. 6. If this had not been done, and instead a linear scale had been used for the time axis, then voltage pulse 620 could not have been resolved on the time axis. Instead, it would have appeared only as a delta function, and its exact form would have been unclear.

At step 550, the control module 350 also determines an approximate value of stator resistance $R_s$ and an approximate value of rotor resistance $R_r$. These approximate values are derivable from the magnitude of voltage V corresponding to the initial peak 667 and the generally flat voltage portion 669 of voltage pulse 665.

At step 560, the control module 350 uses the total of leakage inductances $L_{ls}$ and $L_{lr}$ and approximate values of $R_s$ and $R_r$ to tune the current regulator 320. Control module 350 then causes current regulator 320 to inject a current pulse into the stator winding 362 of induction motor 360. The amplitude of the current pulse is 100% of the current of the stator winding 362 in normal operation. Current regulator 320 varies the voltage V supplied to induction motor 360 so as to ensure that the amplitude of the current pulse is a constant current $I_c$. Thus step 560 corresponds generally to steps 410 and 420 of FIG. 4.

The current pulse applied in step 560 of method 500 is illustrated as current pulse 670 in the lower trace of FIG. 6. The voltage V supplied to induction motor 360 in order to keep current pulse 620 at the constant current $I_c$ is illustrated as voltage pulse 675. Voltage pulse 675 is discussed further in connection with FIG. 7.

At step 570, the control module 350 calculates the stator resistance $R_s$, rotor resistance $R_r$, and a magnetising inductance value $L_h$ of the inductance motor 360 from:
a. The value of the constant current $I_c$; and
b. The values of the applied voltage V during current pulse 670, for example the voltage values shown as voltage pulse 675.

Figure 7:
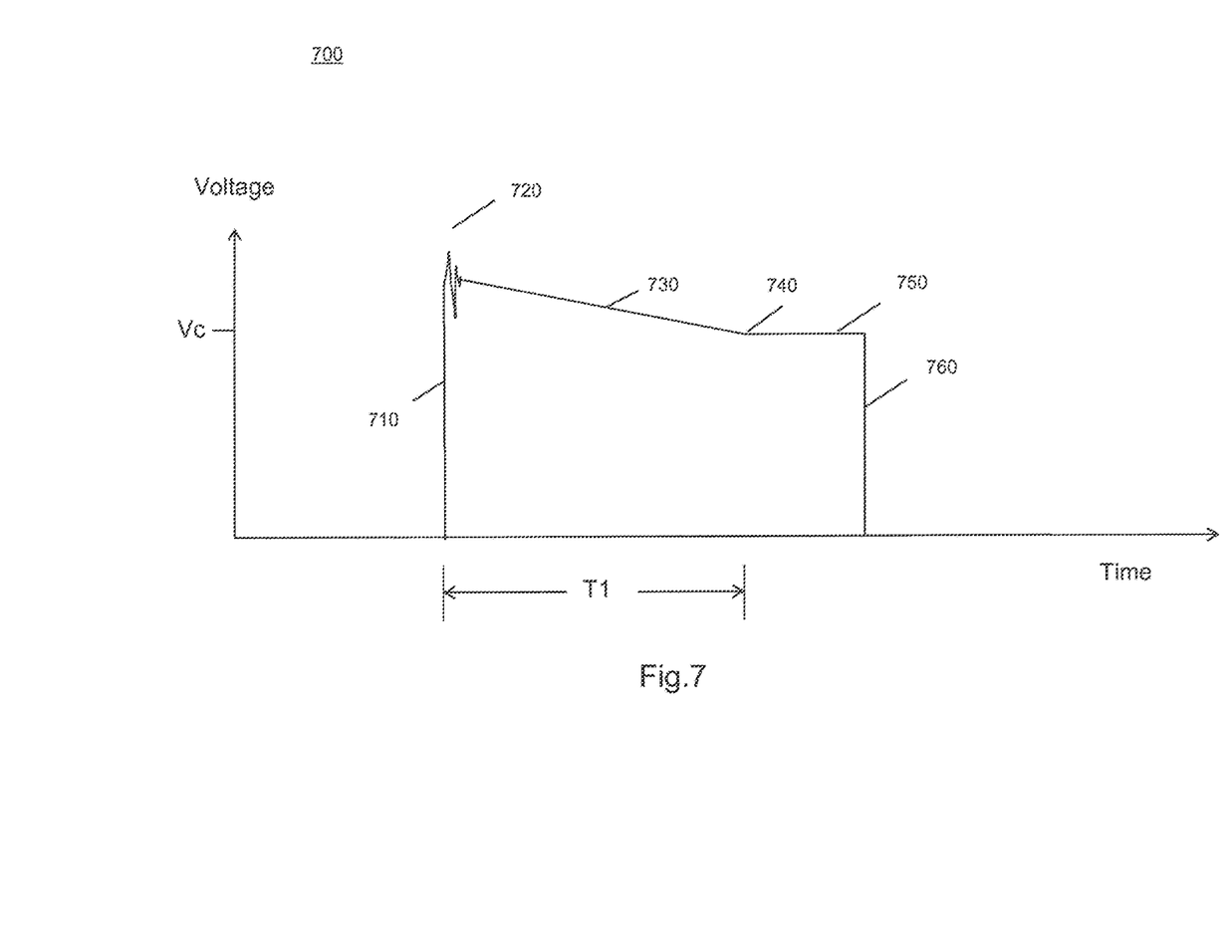
FIG. 7 illustrates details of the voltage pulse of FIG. 6.

FIG. 7 illustrates a voltage pulse 700 of the general form that was shown as voltage pulse 675 in FIG. 6.

Initial portion 710 of voltage pulse 700 rises as the current pulse 670 of the lower trace of FIG. 6 starts. Second portion 720 of voltage pulse 700 represents variations in voltage V that ensure that the current I supplied to induction motor 360 remains as close as possible to constant current $I_c$.

Third portion 730 of voltage pulse 700 represents a decline in voltage V. During third portion 730, the current through the magnetising inductance $X_h$ 230 of induction motor 360 is rising to a constant value. See again the equivalent circuit of FIG. 2.

Point 740 of voltage pulse 700 is the point where the third portion 730 ends, which is the point where the voltage V levels out. Point 740 of voltage pulse 700 represents the point where the current through the magnetising inductance $X_h$ 230 of induction motor 360 has reached a final constant value $I_c$. The time between the start of first portion 710 and point 740 is indicated on FIG. 7 as time period T1.

Fourth portion 750 of voltage pulse 700 represents a situation where the magnetising inductance $X_h$ 230 of induction motor 360 is effectively acting as a short circuit to the rotor resistance 250 of the induction motor 360. This can be seen to be correct from FIG. 2. The voltage level of fourth portion 750 is $V_c$. Voltage level $V_c$ represents the voltage across stator resistance 210, which has resistance $R_s$. Thus $V_c$ is the product of the constant current $I_c$ and the stator resistance $R_s$. Hence:

$$R_s=V_c/I_c$$

Using the relation for $R_s$ given above, therefore, the measured voltage $V_c$ and known current $I_c$ provide a value for $R_s$.

Fifth portion 760 of voltage pulse 700 corresponds to the end of current pulse 670. In a non-limiting example, current regulator 320 may apply the current for a time duration in the range of 0.3 s to 7 s.

Figure 8:
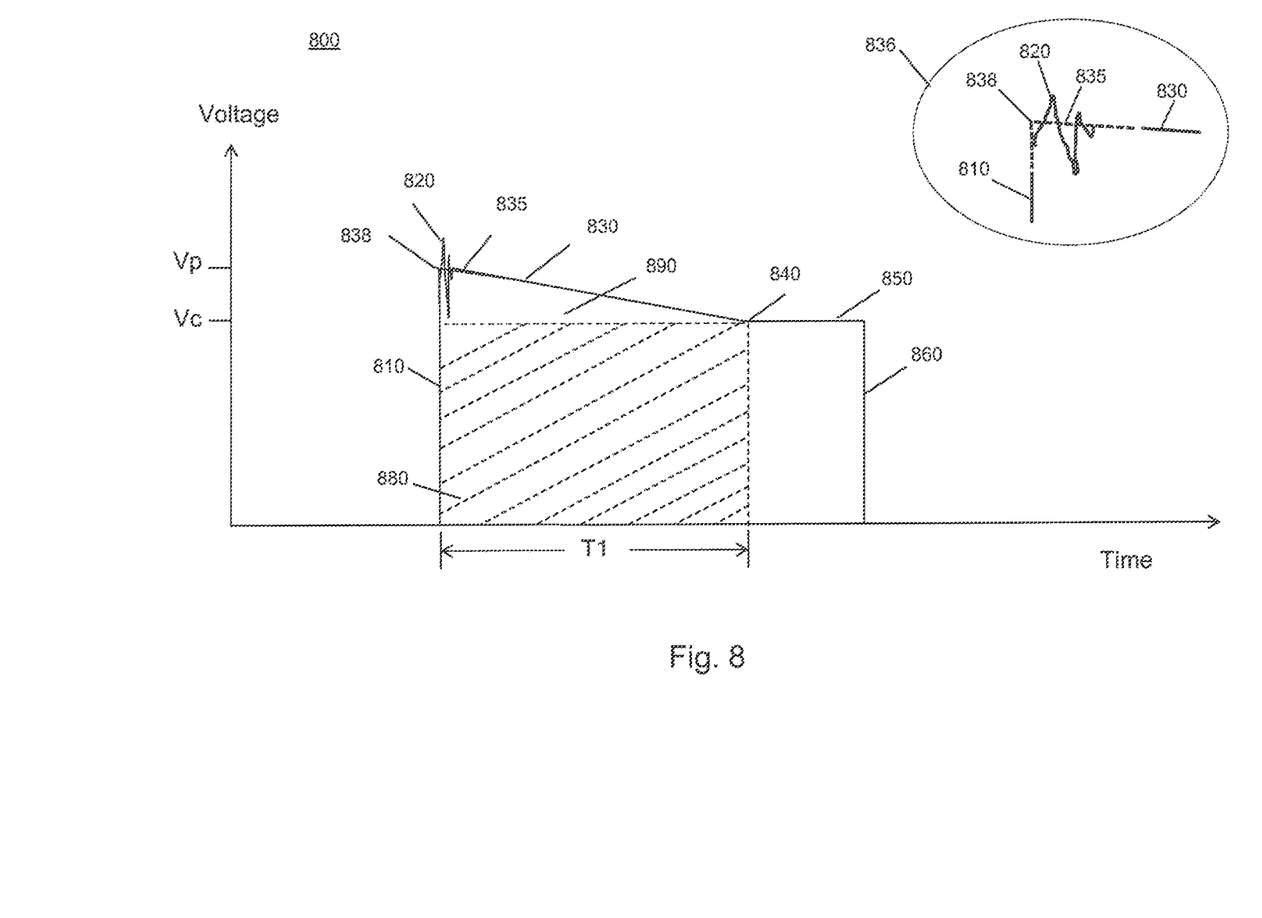
FIG. 8 illustrates details of the voltage pulse of FIGS. 6 and 7.

FIG. 8 illustrates a voltage pulse 800 of the general form that was shown as voltage pulse 675 in FIG. 6 and voltage pulse 700 in FIG. 7.

First area 880 is shown with dashed cross hatching. First area 880 has a height equal to measured voltage $V_c$, and a width equal to measured time period T1.

Third portion 830 of voltage pulse 800 represents a decline in voltage V. An extrapolated portion 835 of third portion 830 is shown rising from the left end of a linear region of third portion 830. Extrapolated portion 835 may be calculated, based on the rate of decline of third portion 830 and the position of first portion 810, e.g. as a continuation of the linear region of third portion 830 with the same gradient as third portion 830. When the linear region of third portion 830 has a complex form, a curve fitting approach may be used to plot the extrapolated portion 835.

Extrapolated portion 835 continues until a peak point 838. Peak point 838 is vertically above first portion 810 of voltage pulse 800. The voltage V at peak point 838 is Vp, as indicated on the voltage axis.

At the upper right of FIG. 8, zone 836 reproduces extrapolated portion 835 and peak point 838 of voltage pulse 800 in greater detail. Within zone 836, extrapolated portion 835 and peak point 838 are shown on an expanded time scale, relative to the main illustration of voltage pulse 800. Extrapolated portion 835 has been shown as a linear extension of the linear region of third portion 830 towards the upper left, through varying second portion 820. Extrapolated portion 835 ends at peak point 838, which lies directly above first portion 810 of voltage pulse 800.

In embodiments where extrapolated portion 835 is not calculated, an estimate of the peak value Vp of voltage 830 may be selected as a point on varying second portion 820. A point towards the mid-range, i.e. away from the peaks and troughs of second portion 820, would be selected. The point would be towards the left part of second portion 820.

Second area 890 is shown immediately above first area 880. Second area 890 represents the area under voltage pulse 800, between first portion 810 and point 840, minus first area 880. Thus second area 890 can be calculated as the total area that lies above the top edge of first area 880, but below the combined third portion 830 and extrapolated portion 835 of voltage pulse 800.

The discussion of FIG. 7 above concluded with a calculation of $R_s$. However, voltage Vp in FIG. 8 is the voltage V necessary to drive constant current $I_c$ through the combination of stator resistance 210 of resistance value $R_s$ and rotor resistance 250 of resistance value Rr. This can be seen to be correct from FIG. 2. At the start of current pulse 670 the magnetising inductance $X_h$ 230 will present a very high impedance to current. So at the start of current pulse 670, and given that Rs is known, the following relation can be used:

$$Rr=(Vp/I_c)-Rs$$

or $$Rr=(Vp-Vc)/I_c$$

Thus the values of Vp and Vc, together with the known value of $I_c$, provide a measurement of Rr.

The remaining variable of interest is the value $L_h$ of the magnetising inductance $X_h$ 230 of induction motor 360. The second area 890 depends on the current increasing through the magnetising inductance $X_h$ 230 of induction motor 360 during time period T1. The greater the value $L_h$ of the magnetising inductance $X_h$ 230, the greater the flux that builds up in magnetising inductance $X_h$ 230 before point 840 is reached, and hence the greater the extent of second area 890. The following relation provides a value $L_h$ for the magnetising inductance $X_h$ 230

$$L_h=\text{(Integral of second area 890)}/Ic$$

When extrapolated portion 835 is calculated and is linear, second area 890 is a triangle. The base of second area 890 has length T1. The height of second area 890 is Vp−Vc. Thus the equation for the value $L_h$ for the magnetising inductance $X_h$ 230 can be re-written as:

$$L_h=[T1\times(Vp-Vc)]/(2I_c)$$

More generally, when second area 890 has a more complex shape:

$$L_h=\int(V-Vc)dt/Ic$$

Control module 350 and current regulator 320 can be considered as acting as a 'low bandwidth' current controller when the rise time of an applied current is comparatively long. Here 'bandwidth' means how much time the current regulator 320 needs to inject a current into stator winding 362 of induction motor 360, i.e. the mean rise time of the current. If the rise time, for example to reach current $I_c$, is comparatively short, then the bandwidth of current regulator 320 is considered to be 'high'. Conversely, if the rise time is comparatively long, then the bandwidth of current regulator 320 is 'low'.

The equivalent circuit parameters of induction motor 360 have thus been determined. Control module 350 is then able to drive induction motor 360 in either continuous or intermittent normal operation. In operation, induction motor control system 300 will generate a drive voltage for induction motor 360 based on the determined equivalent circuit parameters, with control of the frequency and phase of the drive voltage.

Figure 9:
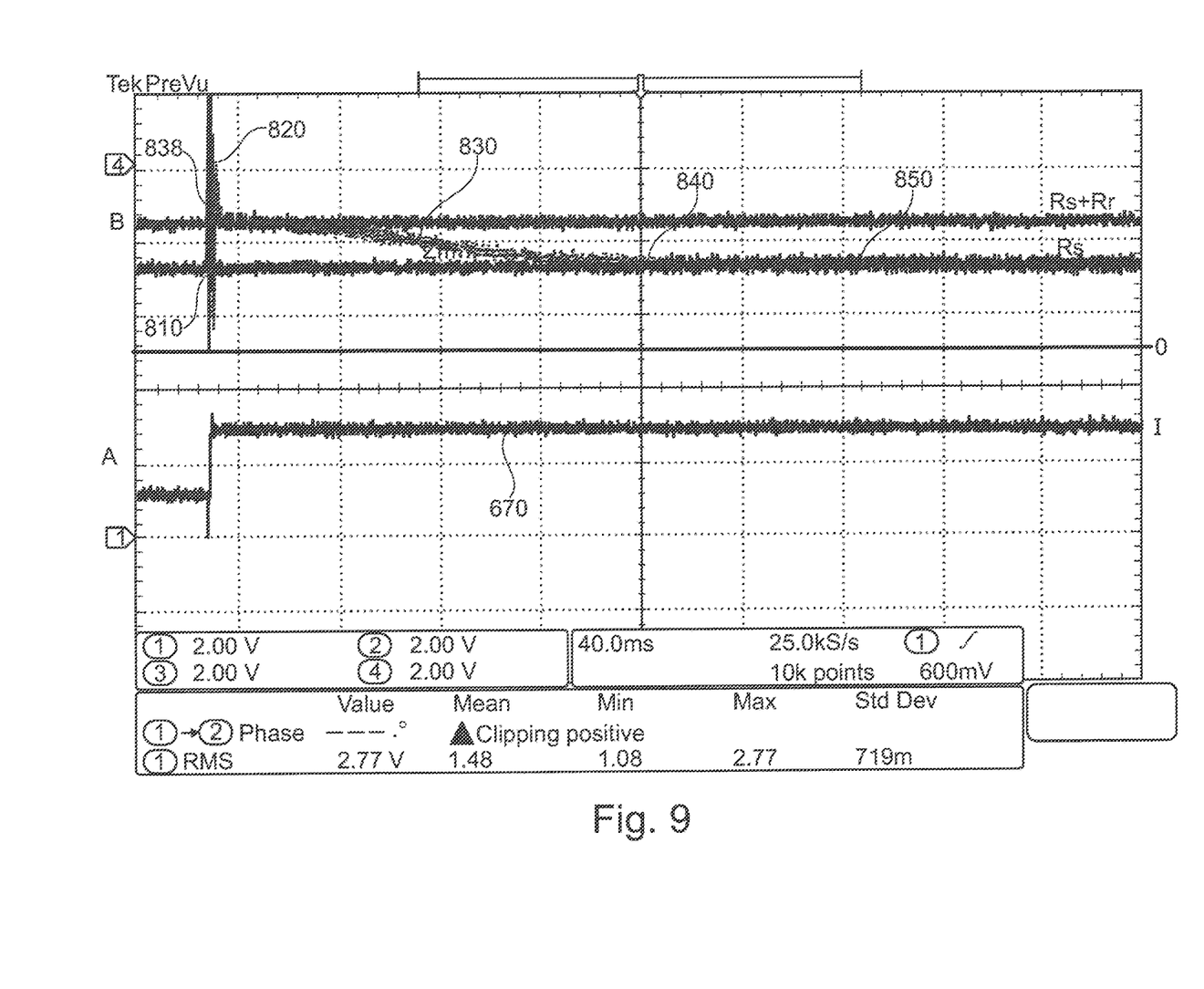
FIG. 9 illustrates a trace taken from a practical application of the method of the invention to an induction motor.

FIG. 9 illustrates a trace taken from a practical application of the method of the invention to an induction motor.

Lower trace A in FIG. 9 shows a current pulse 670 corresponding to current pulse 670 of FIG. 6.

Upper trace B in FIG. 9 shows a voltage pulse, which generally corresponds to voltage pulse 800 in FIG. 8. First portion 810 corresponds to first portion 810 in FIG. 8. Peak point 838, second portion 820 and third portion 830 all correspond to the similarly numbered portions of voltage pulse 800 in FIG. 8. Peak point 838 provides a measurement of peak voltage Vp.

Point 840 represents the end of third portion 830, corresponding to point 840 in FIG. 8. The time between first portion 810 and point 840 is a measurement of time T1. The voltage level of fifth portion 850, which corresponds to fifth portion 850 of FIG. 8, provides a measurement of $V_c$.

Referring back to FIG. 3, induction motor control system 300 can determine the equivalent circuit parameters of induction motor 360, using the methods described above in connection with FIGS. 4-8. The method can also detect the impact of the non-linearity of the inverter module 330 in the induction motor control system 300.

Induction motor control system 300, therefore, comprises current regulator 320 for induction motor 360. Control module 350 determines equivalent circuit parameters of induction motor 360, and is configured to:
  a) apply current I to stator winding 362 of induction motor 360; vary voltage V applied to stator winding 362 so as to regulate current I to be a constant current $I_c$;
  b) terminate application of current I, when applied voltage V has reached a constant voltage $V_c$;
  c) determine the equivalent circuit parameters from: the value of constant current $I_c$; the values of the applied voltage V; and a time period until the applied voltage attains the constant voltage $V_c$.

Induction motor control system 300 may have control module 350 configured to apply constant current $I_c$ to stator winding 362, the constant current being equal or close to the nominal operating current of induction motor 360 when in use, with induction motor 360 remaining stationary during application of the constant current $I_c$. The induction motor control system 300 may further be configured to generate a drive voltage for the induction motor 360 based on the determined equivalent circuit parameters, with control of the frequency and phase of the drive voltage.

The induction motor control system 300 may be integrated with or supplied as part of an induction motor system, which also comprises a three phase induction motor 360.

The embodiments of the invention described above are provided by way of example only. The skilled person will be aware of many modification, changes and substitutions that could be made without departing from the scope of the present invention. The claims of the present application are intended to cover all such modifications, changes and substitutions as fall within the spirit and scope of the invention.

What is claimed is:

1. A method of determining equivalent circuit parameters of a three phase induction motor, the induction motor comprising a stator winding and a rotor winding, the method comprising:
    applying a current to the stator winding;
    varying a voltage applied to the stator winding so as to regulate the current applied to the stator winding to be a constant current;
    terminating application of the current when the applied voltage has reached a constant voltage;
    determining the equivalent circuit parameters from the constant current, the applied voltages and a time period until the applied voltage attains the constant voltage; and
    determining a leakage inductance value, the leakage inductance value comprising a leakage inductance of the stator winding and a leakage inductance of the rotor winding, by:
        applying a voltage pulse to the stator winding, the voltage pulse having an amplitude equal to a drive voltage applied during normal operation of the induction motor and being applied for a second time period;
        determining a current reached during the application of the voltage pulse; and
        multiplying the voltage by the second time period, and dividing by the current reached.

2. The method in accordance with claim 1, wherein the constant current is the normal operating current of the induction motor when in use, and the induction motor remains stationary during application of the current.

3. The method in accordance with claim 1, further comprising:
    determining a resistance of the stator winding by dividing the constant voltage by the constant current.

4. The method in accordance with claim 3, further comprising determining a resistance of the rotor winding by:
    dividing an initial value of the applied voltage by the constant current to determine a total resistance value; and
    subtracting the resistance value of the stator winding from the total resistance value.

5. The method in accordance with claim 4, further comprising:
    calculating the initial value of the applied voltage by extrapolating back from subsequent values of the applied voltage.

6. The method in accordance with claim 1, further comprising:
    varying the applied voltage to ensure that the applied current attains the constant current in a rise time of <10 ms.

7. The method in accordance with claim 1, further comprising:
    applying the current for a time duration in the range of 0.3 s to 7 s.

8. The method in accordance with claim 1, further comprising determining a magnetising inductance of the induction motor by:
    subtracting the constant voltage from each value of the applied voltage, to create an adjusted applied voltage;
    integrating the adjusted applied voltage over the time period to provide an integral value and;
    dividing the integral value by the constant current.

9. The method in accordance with claim 1, further comprising:
    the voltage pulse having a duration in the range 0.02 ms to 3 ms.

10. The method in accordance with claim 1, wherein the voltage pulse precedes application of the constant current.

11. The method in accordance with claim 10, further comprising:
    tuning a current regulator, using:
        the leakage inductance value;
        an initial estimate of the resistance of the stator winding; and
        an initial estimate of the resistance of the rotor winding;
    after tuning of the current regulator, the current regulator providing the current applied.

12. The method in accordance with claim 11, further comprising, after tuning of the current regulator and before the current regulator provides the current applied:
    the current regulator providing an initial constant current for injection into the stator winding, the initial constant current being less than the normal operating current of the induction motor; and
    determining an approximate value for a resistance of the rotor winding;
    determining an approximate value for a resistance of the stator winding.

13. The method in accordance with claim 12, further comprising, before the current regulator provides the current applied, tuning the current regulator using:
    the leakage inductance value;
    the approximate value for the resistance of the rotor winding, as the initial estimate of the resistance of the rotor winding; and
    the approximate value for the resistance of the stator winding, as the initial estimate of the resistance of the stator winding.

14. The method in accordance with claim 12, further comprising:
    the initial constant current being between 30% and 70% of the normal operating current of the induction motor.

15. The method in accordance with claim 12, further comprising:
    the initial constant current having a duration of between 0.1 seconds to 0.5 seconds.

16. A three phase induction motor control system, comprising:
    a current regulator for a three phase induction motor, the induction motor comprising a stator winding and a rotor winding; and
    a control module for determining equivalent circuit parameters of the induction motor, the control module configured to:
        apply a current to the stator winding;
        vary a voltage applied to the stator winding so as to regulate the current applied to the stator winding to be a constant current;
        terminate application of the current when the applied voltage has reached a constant voltage;
        determine the equivalent circuit parameters from the constant current, values of the applied voltage, and a time period until the applied voltage attains the constant voltage; and determine a leakage inductance value, the leakage inductance value comprising a leakage inductance of the stator winding and a leakage inductance of the rotor winding, by:
   applying a voltage pulse to the stator winding, the voltage pulse having an amplitude equal to a drive voltage applied during normal operation of the induction motor and being applied for a second time period;
   determining a current reached during the application of the voltage pulse; and
   multiplying the voltage by the second time period, and dividing by the current reached.

17. The three phase induction motor control system of claim 16, wherein:
the constant current is the normal operating current of the induction motor when in use; and
the induction motor remains stationary during application of the constant current.

18. The induction motor control system of claim 16, the induction motor control system being further configured to:
generate a drive voltage for normal use of the induction motor based on the determined equivalent circuit parameters, the drive voltage having a controlled frequency and phase.

19. An induction motor system, comprising:
the induction motor control system of claim 16; and
a three phase induction motor comprising a stator winding and a rotor winding.

20. A method of determining equivalent circuit parameters of a three phase induction motor, the induction motor comprising a stator winding and a rotor winding, the method comprising:
applying a current to the stator winding;
varying a voltage applied to the stator winding so as to regulate the current applied to the stator winding to be a constant current;
terminating application of the current when the applied voltage has reached a constant voltage;
determining the equivalent circuit parameters from the constant current, the applied voltages and a time period until the applied voltage attains the constant voltage;
determining a magnetising inductance of the induction motor by:
   subtracting the constant voltage from each value of the applied voltage, to create an adjusted applied voltage;
   integrating the adjusted applied voltage over the time period to provide an integral value; and
   dividing the integral value by the constant current.

\* \* \* \* \*